United States Patent [19]

Nakayama et al.

[11] Patent Number: 4,519,119
[45] Date of Patent: May 28, 1985

[54] METHOD OF MANUFACTURING A PISTON FOR A SWASH PLATE TYPE COMPRESSOR

[75] Inventors: Shozo Nakayama, Kariya; Takamitsu Mukai, Anjo; Makoto Ohno, Kariya; Mitsukane Inagaki, Anjo, all of Japan

[73] Assignee: Kabushiki Kaisha Toyoda Jidoshokki Seisakusho, Kariya, Japan

[21] Appl. No.: 574,935

[22] Filed: Jan. 27, 1984

Related U.S. Application Data

[63] Continuation of Ser. No. 308,633, Oct. 5, 1981, abandoned.

[30] Foreign Application Priority Data

Nov. 19, 1980 [JP] Japan ................. 55-163789

[51] Int. Cl.³ ............................................. B23P 15/10
[52] U.S. Cl. ................... 29/156.5 R; 29/458; 29/527.2; 29/DIG. 7; 92/138; 92/175; 92/212; 92/223; 92/248; 427/272; 427/293; 427/388.4
[58] Field of Search ............ 29/156.5 R, 458, 527.2, 29/527.3, 527.4, DIG. 7; 92/129, 138, 175, 212, 223, 248, 249; 417/269; 427/272, 275, 277, 293, 388.4; 308/3 C

[56] References Cited

U.S. PATENT DOCUMENTS

| | | | |
|---|---|---|---|
| 1,837,724 | 12/1931 | Michell | 29/156.5 R |
| 3,181,560 | 5/1965 | Worden et al. | 92/248 X |
| 3,421,972 | 1/1969 | Cromwell et al. | 29/527.4 X |
| 3,700,483 | 10/1972 | Gentsch et al. | 427/277 |
| 3,783,748 | 1/1974 | Cunningham | 92/249 |
| 3,864,815 | 2/1975 | Koch | 29/527.3 |
| 4,289,453 | 9/1981 | Shibuya | 417/269 |
| 4,309,937 | 1/1982 | Schardt | 92/249 |

Primary Examiner—Charlie T. Moon
Assistant Examiner—Ronald S. Wallace
Attorney, Agent, or Firm—Jordan and Hamburg

[57] ABSTRACT

A piston for a swash plate type compressor is disclosed in which a plurality of similar pistons are reciprocated to provide a compressing operation by means of a swash plate which is mounted on the drive shaft and rotated in the compressor cylinder. The piston comprises a piston main body or blank made of aluminium or aluminium alloy, and a coating layer applied to the overall surface of the piston blank except central portions of both outer end faces of the blank, said coating layer being of ethylene fluoride or a copolymer of ethylene fluoride and a vinyl compound, the heat conductivity of which is lower than that of the piston blank.

6 Claims, 4 Drawing Figures

METHOD OF MANUFACTURING A PISTON FOR A SWASH PLATE TYPE COMPRESSOR

This application is a continuation of application Ser. No. 308,633, filed Oct. 5, 1981, now abandoned.

BACKGROUND OF THE INVENTION

This invention relates to a piston for a swash plate type compressor used mainly in a vehicle air conditioning device.

The sliding portions on the piston outer surface and the cylinder inner surface are required to have good airtightness and wear resistancy, and various proposals were made in the past so as to meet these requirements.

As an example, it is already known to have the piston outer surface surrounded by a cup-shaped cover or sheath of fluorine resin consisting of ethylene fluoride or an ethylene fluoride-vinyl compound copolymer (hereafter designated simply as "fluorine resin"). Although such piston may thus be endowed with improved wear resistancy and sliding properties, the cylindrical portion of the sheath necessarily has increased thickness because the sheath is prefabricated in the cup-like shape and applied as it is to the piston. This sheath portion exhibits considerable thermal expansion, resulting in increased fluctuations in the dimension of the gap of piston or side clearance with changes in the temperatures. Thus the compressor may exhibit unstable performance due to considerable changes in the volume efficiency caused by changes in the operating states of the compressor.

It has also been proposed to directly apply the coating of the above fluorine resin to the piston outer surface, with the coating having reduced thickness of the order of 20 to 100 micro meters. While the piston side clearance may thus be reduced to thereby increase the volume efficiency of the compressor, it is necessary, during application of the coating or during surface treatment of the piston blank to be performed in advance of the coating application, such as shot peening, to apply a mask, e.g. by way of the adhesive tape, to the piston flank portion as well as the piston concave that are adapted to receive balls interposed between the piston and the swash plate. Moreover, in the course of the baking step for bonding the coating to the blank surface, surface zones of the piston blank devoid of such coating, that is, the spherical concave and flank portions, may be subjected to strain because these portions have reduced wall thicknesses as compared to the columnar portions on the both piston end portions and moreover may undergo more abrupt rise in the temperatures. Moreover, the coating material may be exfoliated occasionally starting from the boundary line between masked and unmasked zones, especially when the material is locally coagulated on such boundary line on the piston blank surface.

OBJECTS OF THE INVENTION

It is therefore a main object of the present invention to provide a piston for a swash plate type compressor in which the coating may be applied easily on the piston blank surface to facilitate the overall manufacture.

It is another object of the present invention to provide a piston for a swash plate type compressor in which the strain to which the piston blank may be subjected during baking step to bond the coating to the piston blank and during cooling step following such baking, may be reduced to a minimum.

It is a further object of the present invention to provide a piston for a swash plate type compressor having an improved overall appearance and in which the coating on the piston blank may exhibit an increased exfoliation resistancy.

It is still another object of the present invention to provide a piston for a swash plate type compressor in which the flank portions and the spherical concave portions designed for holding the balls may have improved wear resistance and sliding properties so as to reduce the friction loss and noises.

Other objects and advantages of the present invention will become more apparent from the following description especially when read in conjunction with the accompanying drawings.

DETAILED DESCRIPTION OF THE PREFERRED EMBODIMENT

Figure 1:
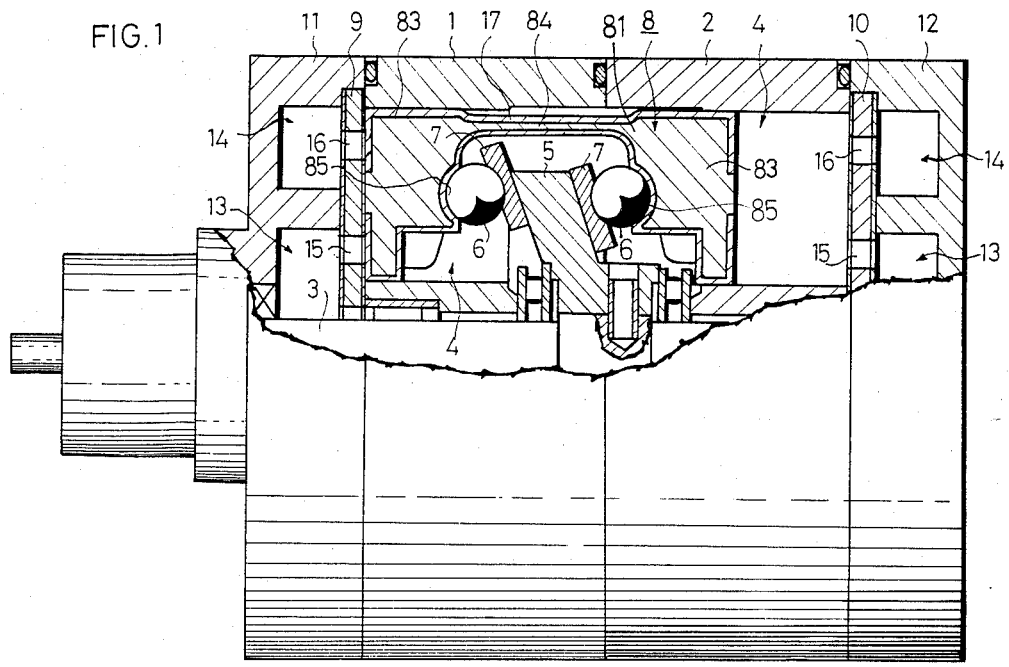
FIG. 1 is a front view, partially cut away and showing an embodiment of the present invention equipped with an inventive piston.
Figure 2:
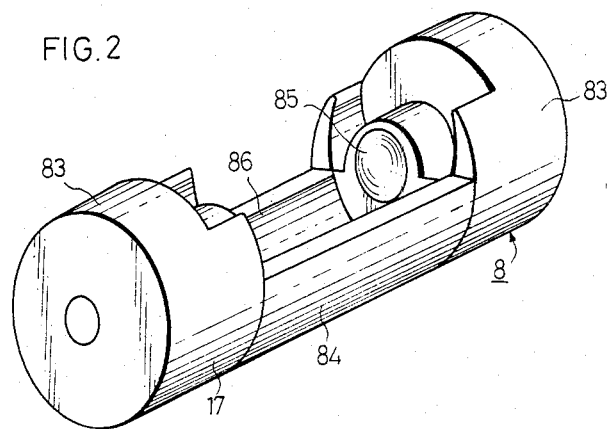
FIG. 2 is a perspective view of the inventive piston.

Referring to the drawings for illustrating a preferred embodiment of the present invention, FIG. 1 shows a swash plate type compressor having built-in pistons of the present invention. The compressor shown comprises a pair of juxtaposed cylinder blocks 1, 2 each being formed with a suitable number of cylinder bores 4 disposed in parallel with a central drive shaft 3 extending through the cylinder blocks. A swash plate 5 secured at a certain angle to the drive shaft 3 carries a piston 8 shown in FIG. 2 by way of bearing means consisting of plural balls 6 and shoes 7. A plurality of such pistons 8 are capable of to-and-fro movement in the associated cylinder bores 4 with revolution of the swash plate about drive shaft 3.

The outer end faces of the cylinder blocks 1, 2 are hermetically sealed by front and rear housings 11, 12 that are mounted on the cylinder blocks 1, 2 via valving plates 9, 10. A suction chamber 13 and a discharge chamber 14 are formed on the inner surface of each of the housings 11, 12. These chambers 13, 14 communicate with an outer refrigeration circuit and with the cylinder bores 4 through suction ports 15 and discharge ports 16 in the valving plates 9, 10. Although not shown, reed valves are mounted in the suction port 15 and discharge port 16.

Figure 3:
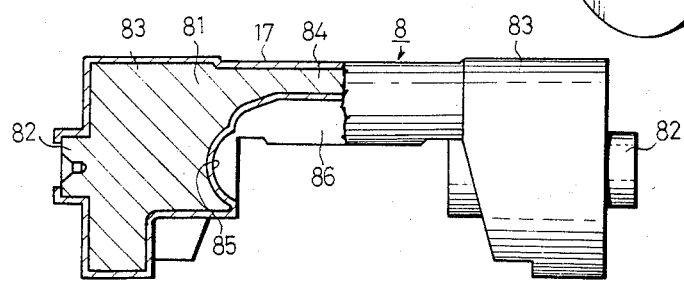
FIGS. 3 and 4 are demi-sectional views for illustrating the piston manufacture steps.
Figure 4:
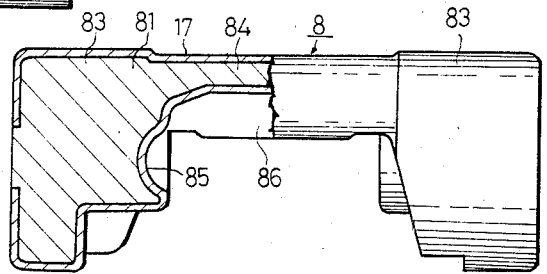

The inventive method for manufacture of the piston 8 will be described by referring to FIGS. 3 and 4 in the order of the manufacture steps.

In the first step, a piston blank 81 is made of aluminium or aluminium alloy to a size smaller than that of the finished article by the thickness of a coating film 17 as will be described later.

In the second step, the blank surface is subjected to shot peening, liquid honing or similar process for removal of any oxide film on the blank surface so as to increase the adhesion strength of the coating film. This surface treatment may be effected for the whole blank surface or only a part of such surface. In the former case, masking process may be omitted. This surface treatment may, if desired, be dispensed with.

In the third step, center projections 82 integrally formed on both end faces of the piston blank 81 are gripped and supported by holding means (not shown). Fluorine resin is then applied by spraying, electrostatic painting or similar coating method for depositing a coating layer 17 on substantially whole surface portions, that is, on all surfaces portions except end face portions of the two projections 82 of the piston blank 81. Since the masking process is not required in this case in distinction from the conventional art described above, almost all surface portions of the piston blank 81 are covered with the coating layer 17.

In the fourth step, the blank 81 painted with the coating layer 17 is baked at about 250° C. to 350° C. for about 30 minutes for positively bonding the coating layer 17 on the blank surface.

During this baking step, since thermal conductivity of the fluorine resin ($6 \times 10^{-4}$ cal/sec. cm.°C.) constituting the coating layer 17 is markedly smaller than and equal to about one thousandth of thermal conductivity of aluminium ($5.3 \times 10^{-1}$ cal/sec. cm.°C.), which is a main component of the piston blank 81, heat quantity transmitted via coating layer 17 to the surface of the piston blank 81 is small at the beginning of the baking stage and the blank 81 is heated only gradually as the baking step approaches to the end. By such gradual heating, the piston blank 81 is subjected to gradual and uniform thermal expansion in both central and superficial zones of both thick walled and thin walled portions of the blank 81. Thus the blank 81 undergoes only small strain as compared to the case wherein the blank 81 is devoid of the coating film and heated on its surface suddenly to a higher temperature from the outset of baking thus causing a large temperature difference and acute thermal expansion between the surface and central portions of the blank 81.

The end portions of the projections 82 of the blank 81 are devoid of the coating film 17 and thence heat may be transmitted promptly towards the thick-walled portions or, two columnar portions 83 of the blank 81. Thus, substantially uniform temperature rise may be attained in the respective portions of the blank 81, resulting in a reduced tendency to produce strain in a connecting portion 84 interconnecting the two columnar portions. Moreover, the blank may be cooled gradually when taken out from the baking furnace for cooling and hence may be subjected only to smaller strain.

In the final step, the projections 82 of the blank 81 are cut off and the columnar portions 83 are finished to a required size. The spherical concave portions 85 and the flank portions 86 engaged by the balls 6 may be finished by machine so as to have the coating layer 17 of suitable thickness for improving the wear resistance and reducing the friction and noises. The shoes 7 may be manufactured easily with various sizes and selected to suit the balls 6. Moreover, shoe clearance may be easily adjustable. Hence, the spherical concave portions 85 may have the coating layer 17 of the same thickness as at the time of coating. The flank portions 86 are not required to be so dimensionally accurate as the columnar portions 83 or spherical concave portions 85 and therefore need not be finished by machine and the coating layer on the flank portion 86 may be left as it is coated. If the coating layer 17 on the flank portion 86 is left as it is, projecting surface portions of the coating layer 17 may be scraped off during trial running by the peripheral portion of the swash plate 5 by way of the finishing machining operation.

In the present embodiment of the invention for manufacture of the piston 8, since the coating layer 17 is formed on the overall surface of the piston blank 81 except central portions of the end faces thereof, masking operation may be omitted to facilitate the manufacture process. Moreover, due to absence of the terminal line of the coating layer 17, the piston may have an improved apppearance, and any exfoliation of the coating layer starting from such terminal line may be prevented from occurring.

In addition, almost all surface portions of the piston blank 81 are covered with the coating layer 17 having low thermal conductivity, the strain to which the piston blank 81 is subjected may be reduced to a minimum due to slow heating as described above. Moreover, the spherical concave portion 85 and the flank portion 86 may have improved sliding characteristics due to the presence of the coating layer 17 thereon, thus resulting in reduced wear of component parts, reduced friction loss and reduced noises due to improved sound absorbing function of these portions 85, 86.

In the course of research or development of the piston 8, the coating layer may be used in place of stress paint. Thus the positions where the maximum stress has occurred may be grasped from cracks produced at the extreme strain positions.

In the foregoing embodiment, the two projections 82 of the blank 81 are cut off for exposing only these portions. However, the blank 81 as a whole may be covered with the coating layer 17, or alternatively, the projections 82 as well as other portions may be devoid of the coating layer 17.

According to the present invention, as described above, the coating layer consisting of ethylene fluoride or ethylene fluoride-vinyl compound copolymer with lower thermal conductivity than that of the piston blank is applied to all or almost all surface portions of the piston blank, not only the piston manufacture may be facilitated and the baking strain of the piston blank reduced, but the coating layer may have improved exfoliation resistance, thus giving rise to improved appearance, wear resistancy and sound absorption characteristics.

It is apparent that various changes may be made within the spirit and scope of the present invention and thus the invention is not limited by the specific mode of execution thereof except as defined by the appended claims.

What is claimed is:

1. A method of manufacturing a piston adapted for a compressor, comprising:

preparing a metal piston body having two axially aligned columnar portions at respective ends thereof, each columnar portion having at least one axial projection including an end surface, cleaning the piston body to remove any dirt and oxide film therefrom, applying a fluorine resin selected from an ethylene fluoride polymer and an ethylene fluoride-vinyl compound copolymer to the overall surface of the piston body except portions of the end surface of each projection, said fluorine resin having lesser thermal conductivity than that of the piston body, baking the piston body with the fluorine resin so that heat is gradually applied to the piston body evenly by passing through the exposed end surfaces of the projections as well as the surface of the piston body with the fluorine resin for positively bonding the resin onto the piston body without imparting strain and distortion to the piston body, and cutting the projections after baking the piston body so that the height of each of the projections is equal to the thickness of the coating of the fluorine resin to make the end surfaces flat.

2. A method of manufacturing a piston according to claim 1, in which said piston body is baked at about 250° C. to 350° C. for about 30 minutes for positively bonding the fluorine resin onto the piston body.

3. A method of manufacturing a piston according to claim 1, in which said piston body further includes a connecting portion interconnecting said columnar portions, said connecting portions being offset from the axis of the two columnar portions, and a flank portion at the inner side of the connecting portion.

4. A method of manufacturing a piston according to claim 3, in which said piston body is made of aluminum or aluminum alloy.

5. A method of manufacturing a piston adapted for a compressor, comprising:

preparing a metal piston body including two axially aligned columnar portions, each of said columnar portions having at least one axial projection extending outwardly along the axial direction thereof, each said axial projection having an end surface, a connecting protion interconnecting said columnar portions, said connecting portion being offset from the axis of the two columnar portions, and a flank portion at the inner side of the connecting portion, cleaning the piston body to remove any dirt and oxide film therefrom, applying a fluorine resin selected from an ethylene fluoride polymer and an ethylene fluoride-vinyl compound copolymer to the overall surface of the piston body except portions of the end surface of each projection, said fluorine resin having lesser thermal conductivity than that of the metal piston body, baking the piston body with the fluorine resin at about 250° C. to 350° C. for about 30 minutes, heat being transmitted to the piston body through the exposed end surfaces of the projections as well as the fluorine resin on the piston body so that two columnar portions and the connecting portion are gradually and equally heated to thereby prevent strain and distortion to the piston body, gradually cooling the piston body with the fluorine resin, and cutting the projections so that the height of each projection is equal to the thickness of the coating of the fluorine resin to make the end surfaces flat.

6. A method of manufacturing a piston according to claim 5, in which said piston body is made of aluminum or aluminum alloy.

* * * * *